US012217304B2

(12) United States Patent
Hilliard et al.

(10) Patent No.: US 12,217,304 B2
(45) Date of Patent: *Feb. 4, 2025

(54) NON-TRANSITORY COMPUTER READABLE STORAGE MEDIUM, SYSTEM, AND METHOD OF AUCTION MANAGEMENT

(71) Applicant: IAA Holdings, LLC, Lincoln, NE (US)

(72) Inventors: Adam Hilliard, Carmel, IN (US); Jeff Hendershot, Carmel, IN (US)

(73) Assignee: IAA Holdings, LLC, Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,910

(22) Filed: Aug. 29, 2022

(65) Prior Publication Data

US 2023/0419395 A1    Dec. 28, 2023

Related U.S. Application Data

(63) Continuation of application No. 17/073,650, filed on Oct. 19, 2020, now Pat. No. 11,430,054, which is a continuation of application No. 15/822,639, filed on Nov. 27, 2017, now Pat. No. 10,810,659.

(60) Provisional application No. 62/426,826, filed on Nov. 28, 2016.

(51) Int. Cl.
| | |
|---|---|
| *G06Q 30/00* | (2023.01) |
| *G06F 16/735* | (2019.01) |
| *G06Q 30/0273* | (2023.01) |
| *G06Q 30/0601* | (2023.01) |
| *G06Q 30/08* | (2012.01) |
| *G06F 3/0482* | (2013.01) |

(52) U.S. Cl.
CPC .......... *G06Q 30/08* (2013.01); *G06F 16/735* (2019.01); *G06Q 30/0275* (2013.01); *G06Q 30/0605* (2013.01); *G06Q 30/0643* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 10,810,659 B2 | 10/2020 | Hilliard et al. | |
| 11,430,054 B2 | 8/2022 | Hilliard et al. | |
| 2001/0034697 A1 | 10/2001 | Kaen | |
| 2007/0214075 A1* | 9/2007 | Ablan | G06Q 40/04 705/37 |
| 2013/0179293 A1* | 7/2013 | Rabenold | G06Q 30/08 705/26.3 |
| 2013/0251337 A1 | 9/2013 | Abecassis | |

(Continued)

OTHER PUBLICATIONS

Hall, Anthony P., Autonomous Agents for Participating in Multiple On-line Auctions, 2001, IJCAI Workshop on E-business and the Intelligent Web, pp. 54-64 (Year: 2001).*

(Continued)

*Primary Examiner* — Allison G Wood
*Assistant Examiner* — Timothy J Kang
(74) *Attorney, Agent, or Firm* — Leydig, Voit & Mayer, Ltd.

(57) ABSTRACT

A system and process allowing for online participation in multiple simultaneous live auctions comprising an auction management system providing an advantageous user display enabling concurrent auction participation.

20 Claims, 15 Drawing Sheets

(56) References Cited

U.S. PATENT DOCUMENTS

| | | | | |
|---|---|---|---|---|
| 2013/0257749 | A1* | 10/2013 | Woods | H04N 21/4823 |
| | | | | 345/173 |
| 2014/0109144 | A1* | 4/2014 | Asnis | H04N 21/43615 |
| | | | | 725/38 |
| 2014/0244446 | A1 | 8/2014 | Ree et al. | |
| 2014/0372243 | A1* | 12/2014 | Ciulla | G06Q 30/08 |
| | | | | 705/26.3 |
| 2014/0379494 | A1* | 12/2014 | Takata | G06Q 30/0275 |
| | | | | 705/14.71 |
| 2018/0150889 | A1 | 5/2018 | Hilliard et al. | |
| 2021/0097600 | A1 | 4/2021 | Hilliard et al. | |

OTHER PUBLICATIONS

Anthony et al., "Autonomous Agents for Participating in Multiple Online Auctions," *IJCAI Workshop on E-Business and the Intelligent Web*, pp. 54-64 (2001).

\* cited by examiner

| | | |
|---|---|---|
| ON-SALVAGE<br>Rear<br>Keys, Starts | Hamilton<br>2016-11-17<br>Lane: 1, Run: 453 | |
| ON-SALVAGE<br>Rear<br>Keys, Starts | London<br>2016-11-16<br>Lane: 1, Run: 571 | Status : Sold |
| ON-SALVAGE<br>Rear<br>Keys, Starts | London<br>2016-11-16<br>Lane: 1, Run: 543 | Status : Sold |
| ON-NOT BRANDED<br>Front<br>Keys, Starts, Drives | Montreal<br>2016-11-17<br>Lane: 1, Run: 43 | High Pre-Bid: $10,100.00 |
| ON-NOT BRANDED<br>Rear<br>Keys, Starts, Drives | London<br>2016-11-16<br>Lane: 1, Run: 85 | Status : Sold |
| ON-AUCUN STATUT<br>Right Front<br>Keys, Starts, Drives | Montreal<br>2016-11-17<br>Lane: 1, Run: 46 | High Pre-Bid: $8,200.00 |

< < 1-10 of 2607 items | 10 Per page ▼

| Detail | Images |

Vehicle Information

| | | | |
|---|---|---|---|
| Stock#: | 10448962 | Damages: | Front, Left Side |
| VIN: | 1FMZU77K35UA93491 | Damage Est: | $20005,12 |
| Title: | ON-SALVAGE | | (http//www.impactaut... |
| ODO: | 222806Km (Actual) | | /DisplayDocument?st... |
| Trans: | Auto | Loss Type: | Collision |
| Cylinders: | | Declarations: | |
| Engine: | Gas | Airbags: | Driver: Good. |
| Exterior Color: | Black | | Other: Good |
| Fnt System: | Cd | Keys: | Yes |

550

Upcoming Vehicles

| Run#: | Vehicle | Brand | High Pre-Bid | AutoBid | Watch |
|---|---|---|---|---|---|
| 553 | 20p5 FORD EXPLORER SPORT TRAC | ON-SALVAGE | None | None | |
| 554 | 2002 TOYOTA CAMRY SOLARA SE/SLE | ON-SALVAGE | $200 | None | |
| 555 | 2001 LEXUS IS 300 | ON-SALVAGE | $375 | None | |
| 556 | 2008 HONDA CMc EX-L | ON-SALVAGE | None | None | |
| 567 | 2006 DODGE GRAND | ON-SALVAGE | None | None | |

No Auctions available to add. — 560
http://auctionnow.impactauto.cw Auctioneers view
572    574

| ↑ Oshawa Lane 1   ⊗ | ↑ Oshawa Lane 2(...   ⊗ |
|---|---|
|  Run#  454<br>2007 BMW 3281<br>Damage: Front, Rear<br>Title: ON-SALVAGE<br>Current Bid: $500<br>[Bidding Disabled] — 571 |  Run#  553<br>2005 FORD EXPLORER SPORT TRAC<br>Damage: Front, Left Side<br>Current Bid:<br>[Bidding Disabled] — 571 |

NON-TRANSITORY COMPUTER READABLE STORAGE MEDIUM, SYSTEM, AND METHOD OF AUCTION MANAGEMENT

CROSS-REFERENCE TO RELATED APPLICATION(S)

This application is a continuation of U.S. patent application Ser. No. 17/073,650, filed on Oct. 19, 2020, which is a continuation U.S. patent application Ser. No. 15/822,639, filed on Nov. 27, 2017, now U.S. Pat. No. 10,810,659, which claims benefit under 35 § U.S.C. 119(e) to U.S. Provisional Patent Application No. 62/426,826, filed on Nov. 28, 2016, the entirety of each of which is hereby incorporated by reference herein.

FIELD

This application is directed to the field of auction management and more specifically to online participation in multiple simultaneous auctions.

BACKGROUND

Auctions offer a significant market for selling a wide variety of products. There are three typical types of auctions: live auctions, online-only auctions, and simulcast auctions. In traditional live auctions, only bidders who are physically present at an auction site are able to bid. Online bidding is not permitted. In an online-only auction, only registered online bidders are able to bid and complete against other registered online bidders. In a simulcast auction, live bidders who are physically present onsite at an auction compete against one another and online bidders who have either placed proxy bids or are bidding live in real time. Simulcast auctions are increasing in popularity. Indeed, in many industries, simulcast auctions are the norm.

Regardless of the auction type, most auctions follow a similar format. At the start of the auction, the auctioneer announces or posts the terms of the sale so that all bidders are aware of their responsibilities in bidding. When a bidder is ready to make a bid on a particular lot, run, or item, they simply raise their hand or their bidder card in a live auction, call in a proxy bid by telephone, or submit a bid online. The auctioneer or ringman will acknowledge the bid with a nod or a call, or post the online bid. The ringman assists the auctioneer in spotting bids, holding up merchandise so the bidders can see the item for bid, and marking the item with the bidder's number once it has been sold.

Upon successful winning of the bid, the auctioneer informs the clerk what the winning bidder paid for the item and their bidder number. This information is recorded and given to the cashier, who tabulates the bidder's purchases for check out from the sale.

In the United States and Canada, automobile auctions are relatively unknown to the public at large but play a major role as a wholesale market for second-hand vehicles. These auctions are a primary outlet for financial services firms to dispose of their large volume of off-lease returns, for rental and other companies to sell off their aging fleets, and for car dealerships to sell off trade-ins or other unwanted inventory. Some auctions in the United States are used by banks, the IRS, and other government agencies to sell vehicles that were repossessed for failure to make monthly payments or pay taxes, or were seized by the FBI, DEA, or the police. Also, there are auctions that sell surplus US Government vehicles. Finally, there are auctions that cater to the salvage market where insurance companies sell totaled vehicles. In the United States and Canada, auto auctions occur in almost every state and province at multiple locations, often simultaneously.

Though technology has greatly expanded the ability of potential buyers to participate in auctions, there is a need for systems and methods that can facilitate participation of users in simultaneous auctions occurring at different locations.

SUMMARY

Embodiments disclosed herein address the above stated needs by providing systems and methods to allow online auction participants to monitor and bid in multiple live auctions simultaneously.

In an example embodiment, a computer implemented process for displaying a user interface on a display comprises the steps of: providing a menu of available online auctions; receiving a user selection of a first online auction; displaying auction status information relating to the first online auction; receiving a user selection of a second online auction; displaying auction status information relating to the second online auction; wherein the display of the auction status information for the first and second select auction includes an input for placing a bid in each of the auctions. Additionally, auction specific information may be displayed for a selected first or second online auction, wherein the auction specific information comprises fields of information including: current lot and bid fields, bid history, auctioneer notes, item specific information, upcoming lots in the selected auction. Further, selecting the second online auction from the auction status causes the auction specific information displayed to the user to switch from the first online auction to the second online auction.

Example embodiments and implementations of the disclosed features overcome the many deficiencies of the prior art and may include one more of the following advantages. Multiple live auctions may be monitored and bid on simultaneously. A user interface facilitates instantaneous information exchange by displaying selected information in a summary format for one or more auctions, while displaying expanded information for a selected auction; provides live audio and/or video feed for a selected auction. Provides bidding capability to monitored auctions and selected auctions. Displays value of items and components of auctioned items. Facilitates offering different capabilities to participants based on one or more user categories.

BRIEF DESCRIPTION OF THE DRAWINGS

The appended drawings illustrate non-limiting example embodiments.

FIGS. 2E-2H are example user interfaces for a search facility in an example embodiment where auction lots comprise vehicles.

FIG. 5 is an illustration of an example user interface implementing an exemplary method.

DETAILED DESCRIPTION

This disclosure is directed to information technology (IT) systems and related methods that facilitate preparation for and participation in multiple auctions that are occurring simultaneously in different locations. The system provides a structure for auctioneers to update current status relating to lots, runs, and specific items up for auction, including current bid, bid history, lot information, item information, timing for bid opening, and timing for last bid and sale. The system also provides for multiple auctioneers to broadcast to the system and for end users to receive information about auctions from several locations happening concurrently or at the same time. Auction participants are able to view and participate in multiple auctions through an advantageous interface.

Some embodiments provide auction management systems that allow users to review, in advance, an inventory of lots that will be sold in a plurality of different auctions and to express interest in particular lots (by submitting advance bids or otherwise). In a preferred embodiment, the auctions are simulcast auctions. The auction management system may include facilities for facilitating participation of online users in a plurality of simultaneous simulcast auctions, including providing real-time live video coverage of a plurality of simulcast auctions. In cases where a user has expressed interest in one or more specific lots being sold in particular auctions, the auction management system may automatically or with user input shift focus to the relevant auction in time for the user to participate in real time as the lot of interest is being sold.

Figure 1A:
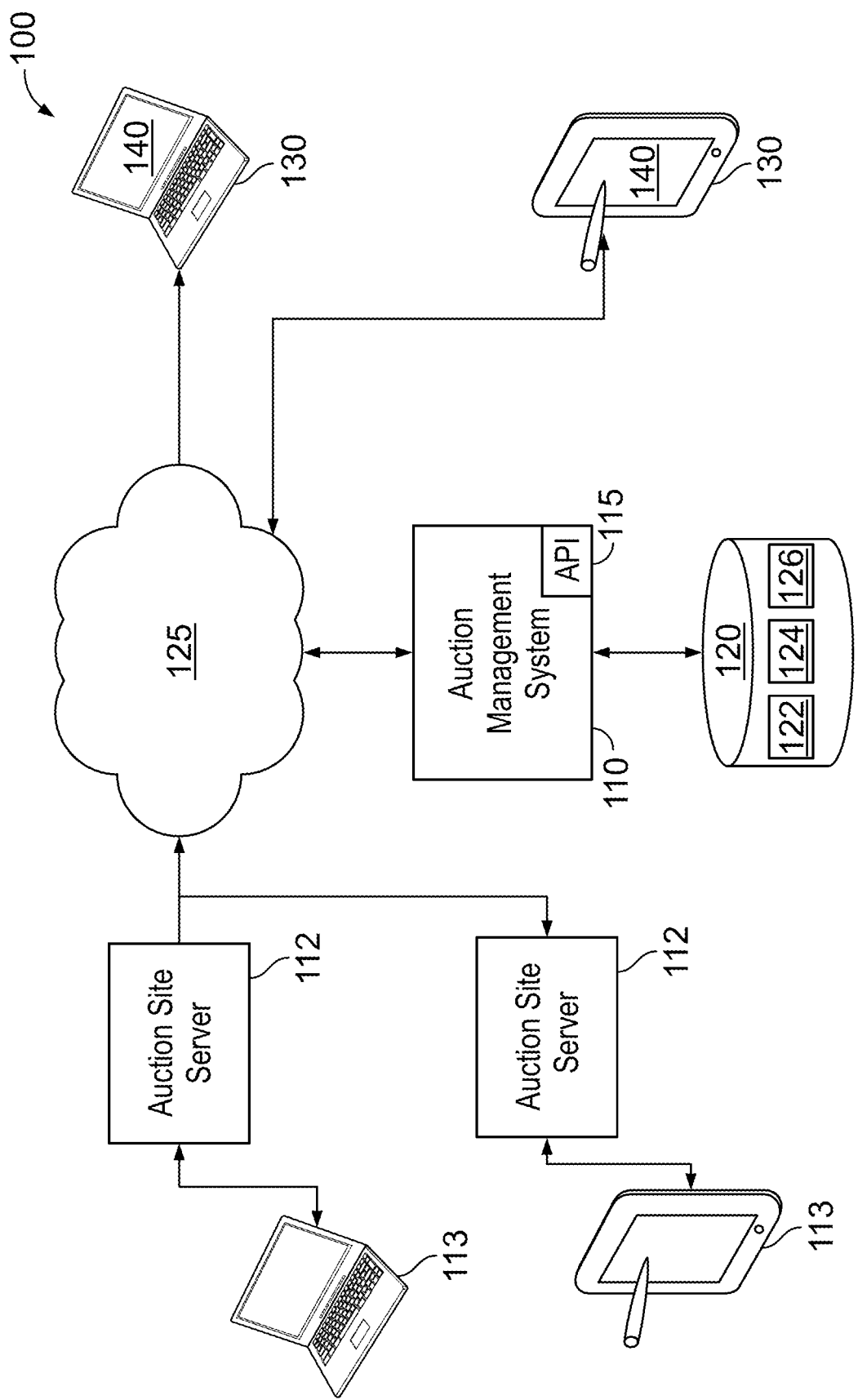
FIG. 1A is a block diagram illustrating an example computing environment.

FIG. 1A is a block diagram illustrating a suitable computing environment 100 for online participation in multiple live auctions. The computing environment 100 includes an auction management system 110, having an Application Programming Interface 115, in communication with databases 120, auction site servers 112, auction site devices 113, auction participant's device 130, all connected via a network 125. Auction management system 110, provides Application Programming Interface (API) 115 service via deployable software (local or cloud-based) and is configured to enable users, customers, enterprise systems, and so on, to access various different auction and product information and control functions provided by the auction management system 110. For example, a user or on-line auction participant at a participant's device 130 (such as a desktop computer, tablet, mobile device, laptop, and so on) may upload, over a network 125 (e.g., a closed network, local area network ("LAN"), a wide area network ("WAN"), private network, public network, inter-network (e.g., the Internet), and peer-to-peer networks (e.g., ad hoc peer-to-peer networks), an application or other content 140 information associated with the auction management system 110 that may include the status of a current lot or run associated with an auction in progress. In some embodiments the auction management system 110 may communicate with other computer systems instead of one or more end user terminals.

The content 140 associated with the auction management system 110 may contain various different scripts or modules, such as one or more javascript modules that facilitate communicating over the network 125 to the auction management system 110 (e.g., calling the API 115), in order to access and retrieve certain information associated with the auction management system and to allow a user to interact with and control aspects of operation of the auction management system. For example, content 140 may facilitate access to information such as lot information, product information, bid information, and the like. The auction management system 110 may store such information in various databases or memory, either local to the system or in various cloud-based storage services.

For example, a database 120 may include lot information 122 associated with products in a particular auction including product identification numbers, manufacturing data, parts lists, suggest value, product condition, bid history, current bid, reserve prices, bid increments, etc. The database 120 may also include customer data or participant information 124, such as customer preferences, previous order information, customer subscription levels, marketing information, payment history, and the like.

In operation, information relating to a specific product in a specific lot is retrieved from database 120 and sent to the local auction site and displayed on the auction site device 113. Upon receiving a bid, the auctioneer or auction site administrator is able to transmit the bid to the auction management system 110, and the bid information is updated in the auction management system 110. Online auction participants receive up to date bid histories and other auction information at participant's device 130.

Figure 2A:
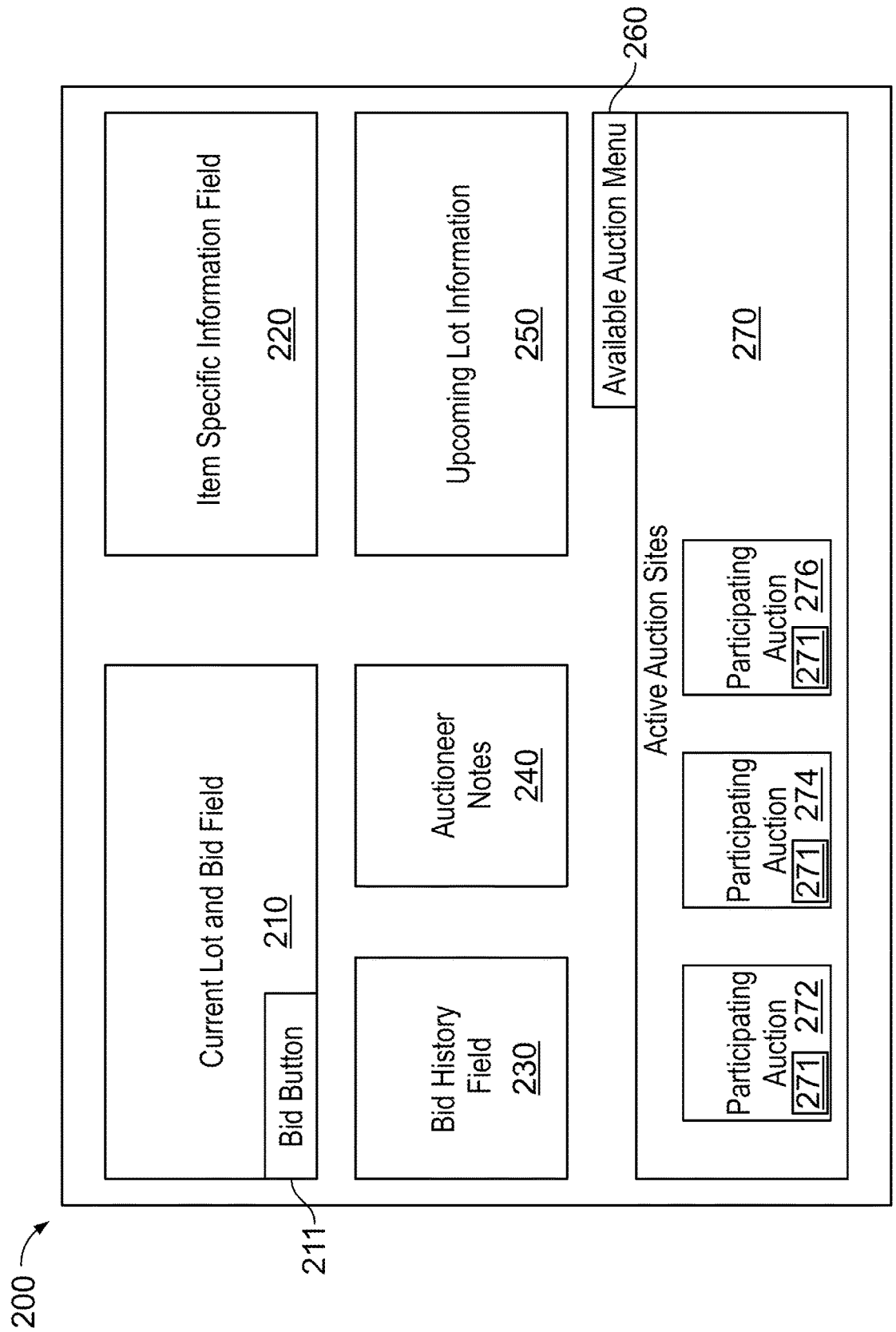
FIG. 2A is an illustration of an example user interface implementing an exemplary method.

FIG. 2A schematically illustrates an example embodiment of a graphical user interface that demonstrates the ability of an auction participant to prepare for, monitor, and participate in simultaneous auctions. As shown, a display at a user terminal such as online auction participant's device 130 (e.g., a desktop computer, laptop, tablet, mobile device, internet television, or the like) includes the following visual fields: current lot & bid field 210; item specific information field 220; bid history field 230; auctioneer notes field 240; upcoming lots field 250; available auction menu field 260; active auctions field 270, including first participating active auction window 272, second participating active auction window 274, and third participating active auction window 276.

The current lot & bid field 210 provides information to the auction participant relating to the lot that is currently up for auction or next up for auction. Information provided in this field may include the lot or run number, the stock or item number, or numbers for items in the lot or run; relevant information to the item or items such as brand, model, condition, photos and/or video of the item; as well as the current bid and active bid. If the auction has not yet commenced, the current lot & bid field 210 can provide an indication as to the expected start time of the auction for the lot. If the auctioneer has an active bid with no competing bid, the current lot & bid field 210 can provide an indication or countdown to the final sale, as well as an indication that the lot or run is sold.

Also included in the graphical interface to the auction participant is an item-specific information field 220. Here specific and detailed information can be included about the item or items that form the lot or run that is currently on the auction block. Detailed information can include stock number, product or manufacturer's identification numbers, component lists, features lists, item(s) condition, as well as additional images or video.

Also included in the online auction participant's display is a bid history field 230, which indicates the lot or run number, when bidding is open, and a list of past bids, which may include the bid amount, the bid time, and who made the bid.

Also included in the online auction participant's display is an auctioneer's notes field 240, which may indicate the sales of previous lots or runs along with the sale amount(s) and who the winning bidders were. The auctioneer may also communicate other messages or indicators to the online auction participant, such as a temporary suspension of bidding, lot specific rules or conditions, reserves, or changes in the order of lot presentation.

The auction schedule including the order of lot presentation may be displayed to the online auction participant in the upcoming lots field 250, which may include the following information: lot or run number, item(s) or stock number(s), item(s) brand or model name, item(s) year, item(s) condition, pre-bid information, etc.

In some example embodiments, item specific information field 220; bid history field 230; Auctioneer Notes field 240; and/or upcoming lots field 250 may be linked to current lot & bid field 210 such that, when current lot & bid field 210 is displayed, the other fields are automatically displayed as well. In some embodiments, the online participant may customize fields to determine which display fields are linked to the current lot & bid field 210. In some embodiments, specific fields or information in specific fields may be made available to the online auction participant based on any number of factors including: subscription level, participation history, credit, payment history, geographic location, auction type, etc.

An available auction menu field 260 may be displayed when one or more auctions from one or more auction sites are available to the online auction participant. The available auction menu field 260 may be a drop down menu, a list, an icon field, or other indication of available auctions. The specific auctions made available to the online auction participant may be based on a variety of factors and may include: subscription level, participation history, credit, payment history, geographic location, auction type, etc.

Upon selection of one or more auctions from the available auction menu field 260, a selected auction is displayed in the active auctions field 270. Each selected auction may have a dedicated window within a window in the active auctions field 270. For example, active auction window(s) 272, 274, and 276 may show information relating to auctions selected from the available auction menu field 260. Within the active auction window(s) 272, 274, and 276, information may be displayed in real time to the online auction participant. Such information may include the current lot or run number, the item or stock number(s), the item(s) name(s), and the current bid. In some embodiments, a user can simply select the desired active auction window(s) 272, 274, or 276 by touch screen, cursor, or other input. Such selection will display the current lot & bid field 210, item specific information field 220, bid history field 230, auctioneer notes field 240, and/or upcoming lots field 250 on the display of the auction participant.

Figure 1B:
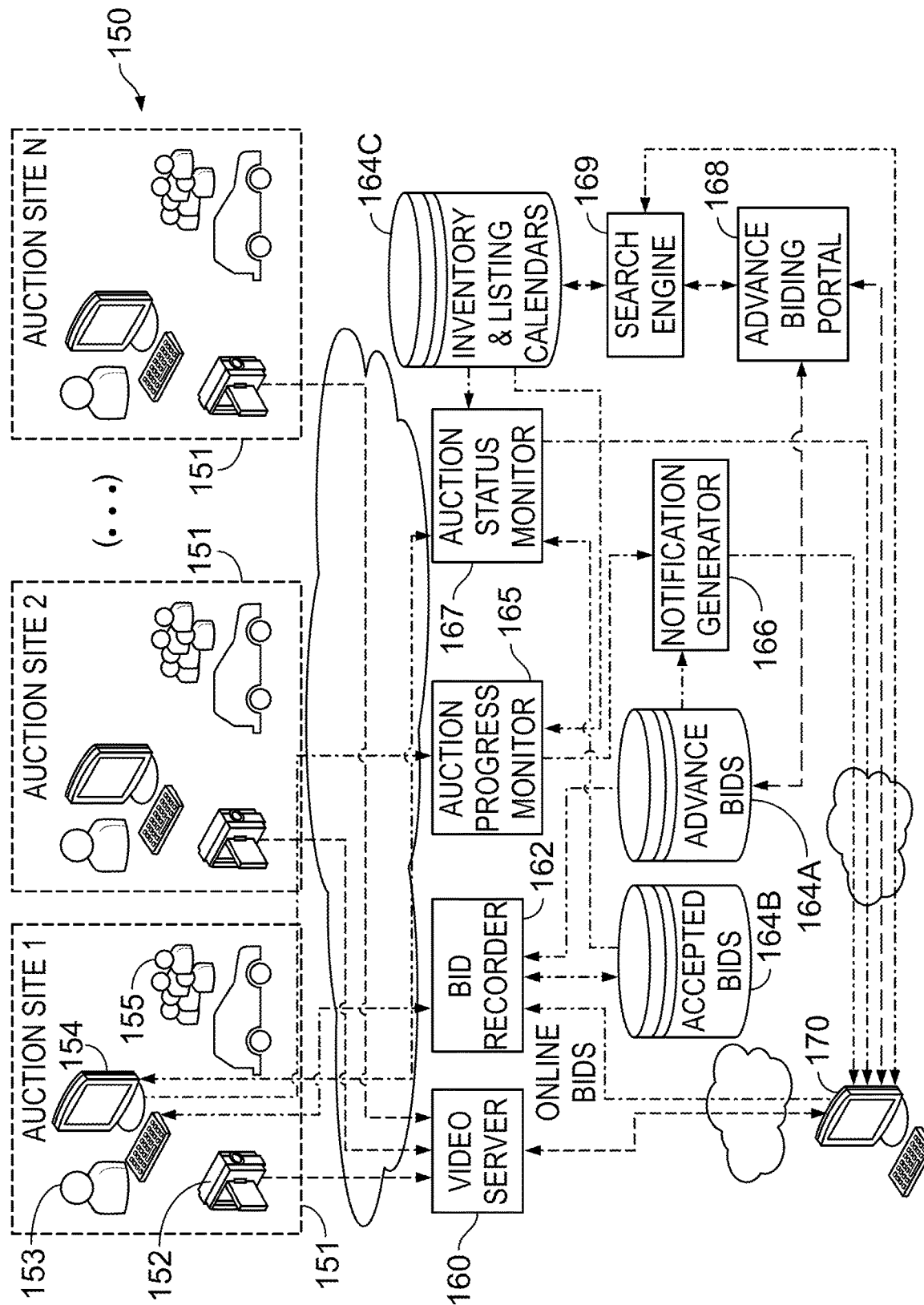
FIG. 1B is a block diagram illustrating functional elements of another example computing environment.

FIG. 1B is a schematic diagram illustrating functional aspects of a computing environment 150 according to a non-limiting example embodiment. Computing environment 150 facilitates participation of users in a plurality of auctions. Auctions 1 to N are illustrated. Each auction is at a corresponding site 151. Some auctions may take place at the same geographical location (e.g. as different lanes at a common auction facility). Some auctions may be geographically separated from one another (e.g. in different cities, states, provinces or countries).

One or more video cameras 152 provide video feeds which capture sound and audio for each auction. In cases where an auctioneer moves during the auction (e.g. in a car or heavy equipment auction the auctioneer may move to the locations of different cars or items of equipment being sold), camera(s) 152 may be mobile. For example, cameras 152 and an interface that delivers video signals from video cameras 152 to a video server 160 may be carried by a person or a vehicle (not shown) that moves with the auctioneer to each lot that is being sold.

A user device 170 is connected to receive real time video data from cameras 152 at one or more auction sites 151 by way of a network such as the Internet (indicated generally by clouds in FIG. 1B). Any suitable networking technology may be provided to deliver the video data to user device 170. User device 170 may execute software (e.g. in the form of an application, a web-enabled app, a script such as Javascript or the like that facilitates interaction between a user and system 150 as described herein. In some embodiments user device 170 is configured to simultaneously display real time video from two or more auction sites 151.

A control terminal 154 is provided at each auction site 151. Control terminal 154 enables an auctioneer or an assistant 153 to interact with computing environment 150 to perform functions such as: indicating to the system which lot will be sold next; indicating to computing environment 150 an opening bid for the lot; triggering a countdown to the start of bidding for the lot; indicating to the system the values and bidder ID for bids received from on-site bidders 155, receiving from system online bids being placed in real time by a user of a user device 170, receiving from computing environment 150 values for advance bids for the lot, indicating to the system when a countdown to the close of bidding has been initiated, and indicating to computing environment 150 the value and bidder ID corresponding to the winning bid.

As each sale progresses, bids are processed by a bid recorder 162 which receives advance bids from database 164A, receives online bids from user devices 170 and receives on-site bids from control terminal 154. Accepted bids are stored in database 164B.

One problem with simulcast auctions is that it is not usually possible to schedule an exact time at which each lot will be put up for sale in advance. Timing is at the discretion of the auctioneer and may be affected by the number of participating bidders (both on-line and on-site), conditions at auction site 151, and the like. This may create difficulties for online bidders who are following multiple auctions by way of user devices 170. Such online bidders may find it onerous to follow the progress of every auction that contains a lot that they are interested in so that they can monitor and participate in the sales of the lots of interest.

Computing environment 150 provides functionality for assisting online users to tune in to different auctions when lots of particular interest to the online users are being sold. An auction progress monitor 165 receives inputs from control terminal 154 and also from listing calendars in database 164C. A listing calendar is generated and assigned for each auction, where the listing calendar includes a list of lots being auctioned. The lots included in the listing calendar are identified by their corresponding lot number and ordered according to an order in which the lots will be auctioned. The auction progress monitor 165 estimates what lot(s) will be next up for sale at each auction site 151 and when the sale of each of these lots will commence according to the lot number and order included in the listing calendar.

Output from the auction progress monitor 165 is provided to notification generator 166 which compares the upcoming lots in each auction to lots of interest to individual users of user devices 170 from database 164A and generates notifications and/or control signals to individual user devices 170. For example, the auction progress monitor 165 may send a notification command to the notification generator 166 when a lot that is a predetermined number of spots ahead of a lot of interest is detected to be currently up for auction (e.g., current lot for auction is 5 spots ahead of a lot of interest). The notifications and/or control signals cause user devices 170 to alert users that sales of lots of interest will be starting soon and may optionally control user devices 170 to shift focus to the auctions in which the next lot of interest to the user of the user device 170 will be sold.

As each auction progresses, status of the auction is tracked by auction status monitor 167. Auction status monitor provides user devices 170 with details pertinent to each auction. The details may include things such as: particulars of the lot currently being sold; auctioneer's notes; a history of recently-sold lots; a list of lots coming up; and so on. Such information may be delivered for display on user devices 170.

Figure 2B:
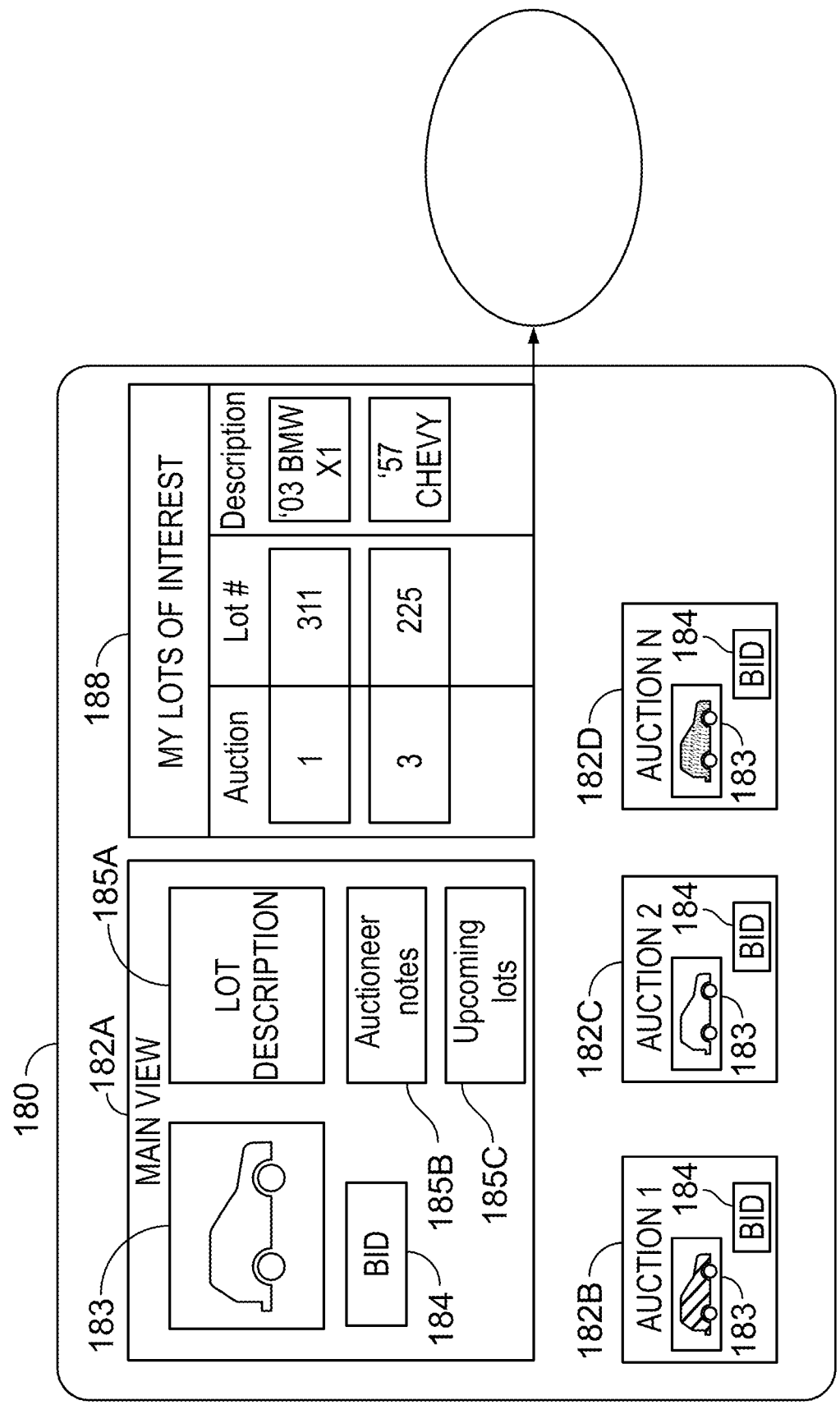
FIG. 2B through 2D are views of an example user interface and illustrate some ways in which a user may be warned that a lot in which the user has expressed interest is coming on for sale.
Figure 2C:
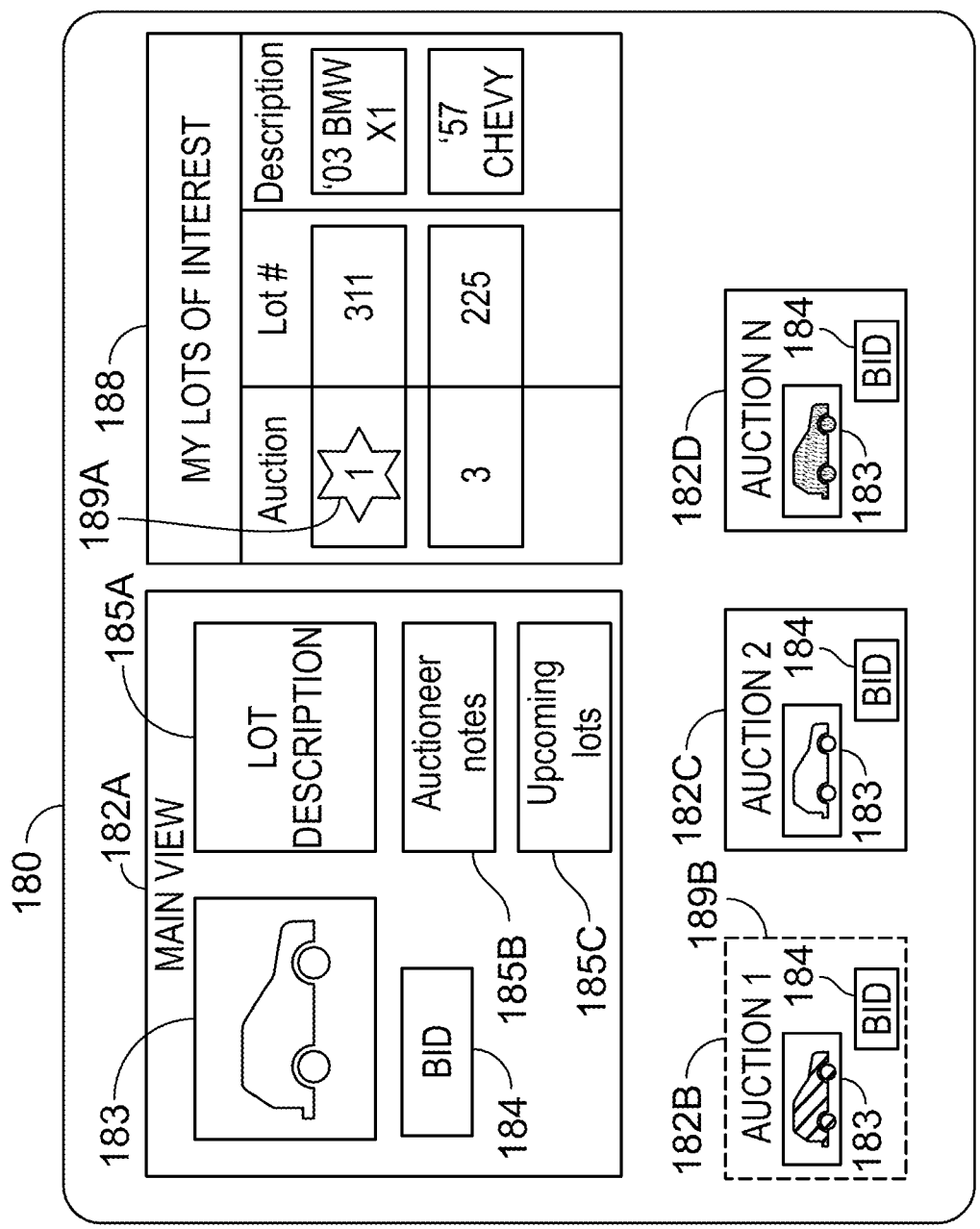
Figure 2D:
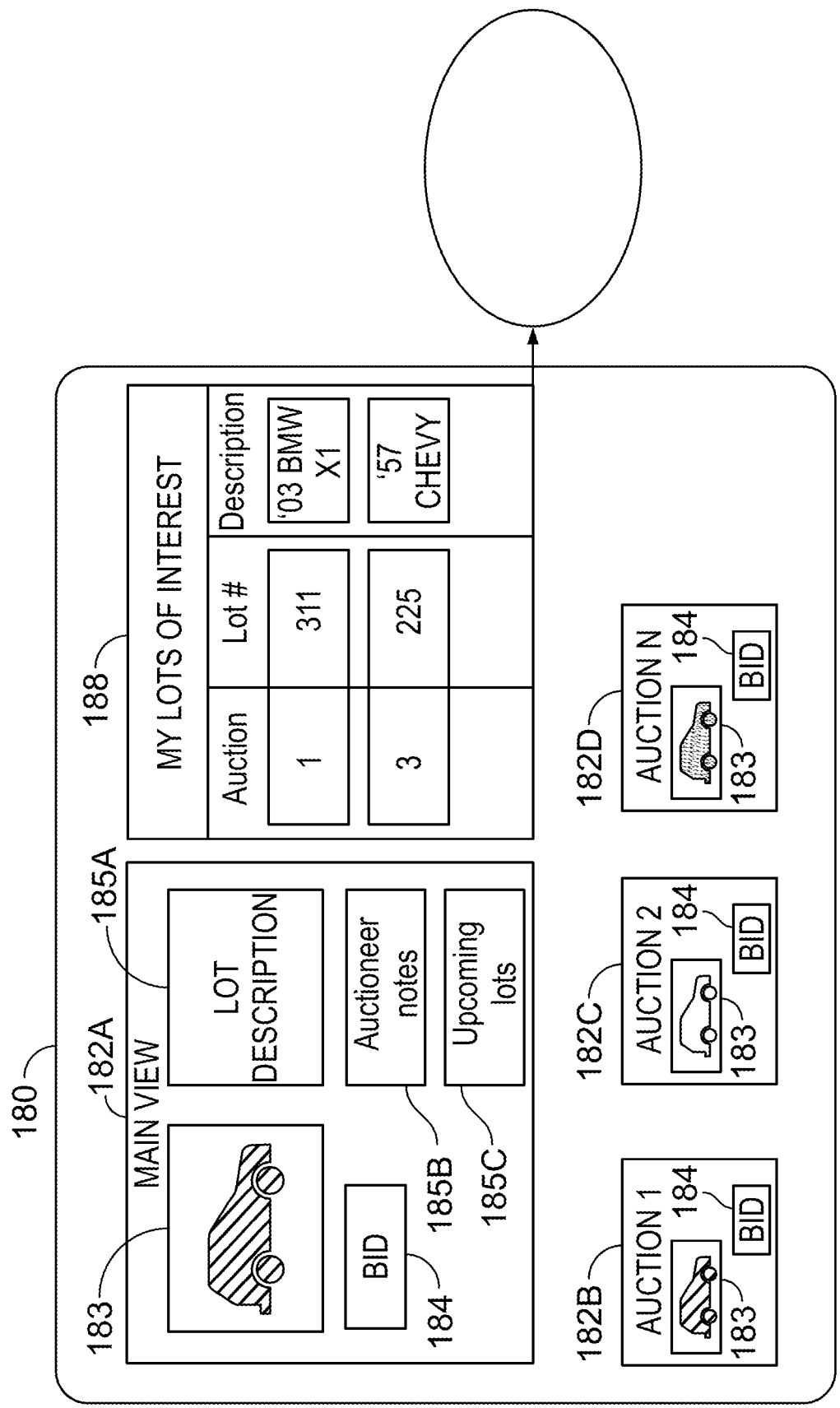
Figure 2E:
Figure 2F:
Figure 2G:
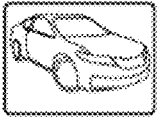

FIGS. 2B, 2C and 2D are simplified schematic views of an example user interface 180 that illustrates one possible mode of operation of computing environment 150. User interface 180 includes separate sections 182 for a plurality of different auctions. Sections 182A, 182B, 182C, and 182D are shown. Each section 182A-182D includes a video player 183 that can present streaming video of the corresponding auction from a camera 152 at one of sites 151.

Each section 182 also includes a bid control 184 that a user can operate to bid on the lot currently being sold in the corresponding auction. Section 182A is larger than other sections and provides a main view which includes more details of the corresponding auction than other sections 182B-182D. In one embodiment, a user can monitor a plurality of auctions in each of other sections (e.g. sections 182B through 182D) and can select one auction to be highlighted in section 182A. In the illustrated embodiment, section 182A includes field 185A which provides information describing the lot currently being sold or a next lot to be sold if no sale is currently in progress and the auction is not yet over, field 185B that displays any auctioneer notes, and field 185C that includes upcoming lots.

In the illustrated embodiment, the main view in section 182A is displaying auction 2 which is also being shown in section 182C. User interface 180 also includes a panel 188 that lists lots of interest to the user of user device 170 in the order in which those lots are expected to come up. The lots of interest may be distributed among multiple auctions. In the illustrated embodiment, panel 188 includes rows listing the auction, lot number and description for each lot of interest.

Advantageously, the quality of the video played in a main view of the section 182A may be of much better than the quality of the video played in the other sections 182B-182D. For example, some or all of the data rate, frame rate, video resolution, or data compression may be set to degrade the video quality in the other sections 182B-182D that are not the main view of the section 182A. This way, the video quality of the video played in the main view of the section 182A may be significantly better than the video provided in the other sections 182B-182D. The video quality of the video played in the other sections 182B-182D may be sufficient to allow a user to understand the general state of progress of the associated auction. By automatically providing reduced quality video image data for auctions other than the one being followed in section 182A computing environment 150 may conserve bandwidth. According to some examples, the video quality that is displayed within either the main view of the section 182A or the other sections 182B-182D may be controlled (e.g., modify video quality) based on a detected video playback capability of a device receiving the video. For example, the video quality may be degraded to ensure the displayed video on the receiving device is adequate for sufficient playback based on the video playback capabilities. In addition or alternatively, the video quality that is displayed within either the main view of the section 182A or the other sections 182B-182D may be controlled (e.g., modify video quality) based on a detected data streaming attribute (e.g., speed or bandwidth of internet connection) of the device receiving the video. For example, the video quality may be degraded to ensure the displayed video on the receiving device is adequate for sufficient playback based on the data streaming attributes.

When a lot of interest is coming up soon, notification generator 166 in combination with software on user device 170 may highlight this fact to a user in one or more ways as illustrated in FIG. 2C. For example, user interface 180 may be controlled to highlight the upcoming lot of interest in pane 188 as indicated by 189A and/or highlight the section corresponding to the auction in which the lot of interest may be sold as indicated by 189B. Highlighting may comprise, for example, changing one or more appearance attributes of a control, a border and/or a section of a user interface. The appearance attributes may comprise, for example, a color, brightness, a size, a time variation, a texture, some combination of these or the like.

Other notifications may be provided by user device 170 instead of or in addition to the above. For example, user device 170 may provide an audible alarm, voice alert, pop-up window, or other notification that informs the user of user device 170 that a lot of interest is coming up. The timing of this notice may track the actual timing of the auction in question as determined by auction progress monitor 165.

According to some embodiments, only the video player 183 in section 182A displays the live video stream, while the video player 183 in sections 182B-182D do not display the live video stream. However, when one of the sections 182B-182D are highlighted or otherwise called on by a notification that a lot of interest is coming up in the respective auction, the video player 183 in the section 182B-182D including the lot of interest may begin to display the live video stream (either in full or a reduced quality). By controlling the display of live video within the video player 183 of the different sections 182A-182D in this way, an improvement in the conservation of data bandwidth is achieved.

As illustrated in FIG. 2D, in some embodiments user interface 180 may automatically switch focus to an auction containing the lot of interest as the sale of the lot of interest becomes imminent.

Various mechanisms may be provided to allow users of user devices 170 to express interest in specific lots in advance (either by placing advance bids or otherwise). In the example computing environment 150 shown in FIG. 1B, an advance bidding portal 168 allows users of user devices 170 to access a search engine 169 that can perform searches for inventory recorded in database 164C. For example, a user could access search engine 169 to search for vehicles by model, year, etc. FIGS. 2E-2H show example interfaces that may be provided by advance bidding portal 168. If a user identifies lots that the user would like to place bids on one or more lots in advance ('pre-bids' or 'advance bids') then the user may do so. The advance bids are stored in database 164A.

The functional elements depicted in FIG. 1B are not necessarily discrete and separated from one another. In some embodiments the functions of two or more such functional elements are provided by a single device or group of devices. Similarly, although FIG. 1B shows databases 164A, 164B, and 164C, the functions of two or more of these databases may be combined.

Figure 3A:
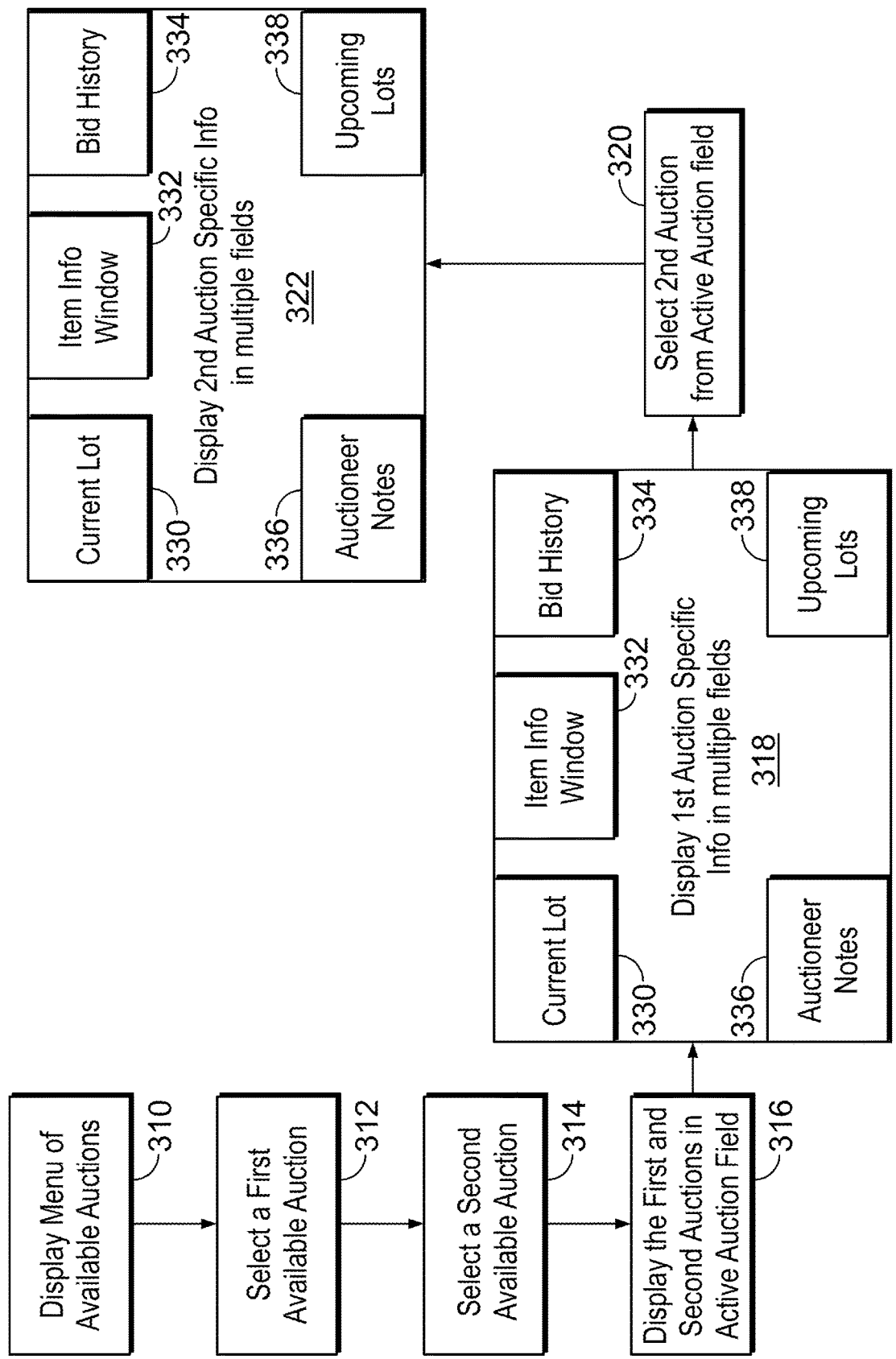
FIG. 3A is a flow chart illustrating an exemplary method.

FIG. 3A is a flow chart depicting an example method 300 comprising the steps of: displaying a menu of available auctions 310; selecting a first available auction 312; selecting a second available auction 314; displaying the first available auction 312 and second available auction 314 in an active auction window 316; wherein the information relating to the first available auction is displayed 318 in one or more of the following auction detail windows: a current lot and bid window 330, an item information window 332, a bid history window 334, an auctioneer notes window 336, an upcoming lots window 338. The next step is selecting the second active auction 320, wherein information for the second auction is automatically displayed in window(s) 330, 332, 334, 336 and 338.

Figure 3B:
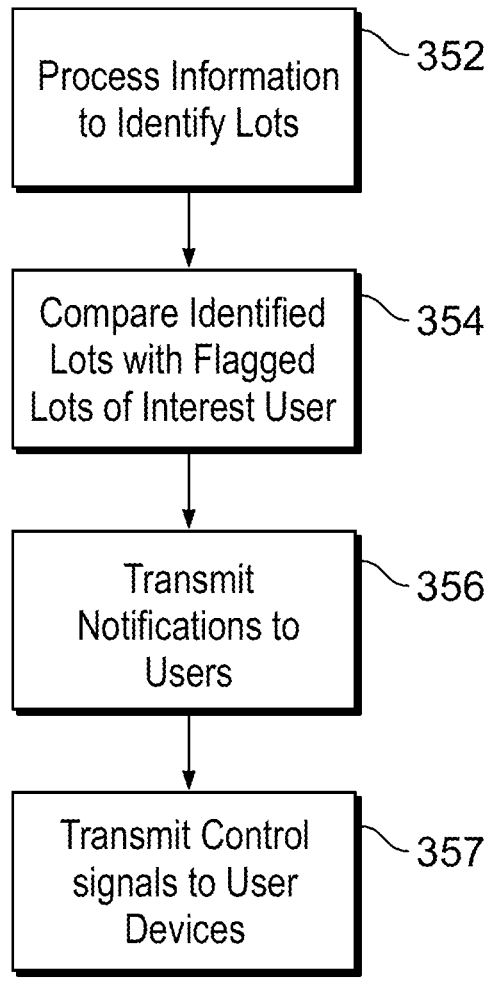
FIG. 3B is a flow chart illustrating another exemplary method.

FIG. 3B is a flow chart illustrating a method 350 that may be performed by an auction management system such as auction management system 110 or computing environment 150. Method 350 receives information regarding the progress of a plurality of auctions. Each auction comprises a sequence of sales of individual lots that can be bid on. At block 352, method 350 processes received information to identify lots in each auction for which sales are expected to commence within a threshold time. At 354, the lots identified by block 352 are compared to lots that have been flagged by users as being of interest (e.g. lots on which the users have placed pre-bids). At block 356, notifications are transmitted to user devices for those users in which the lots identified at block 352 match one or more lots flagged by the users. The notifications at least identify the auction and flagged lot. At optional block 357, control signals are transmitted to user devices. The control messages cause the auctions corresponding to the flagged lots to be viewed in a main display of the user devices.

Figure 4:
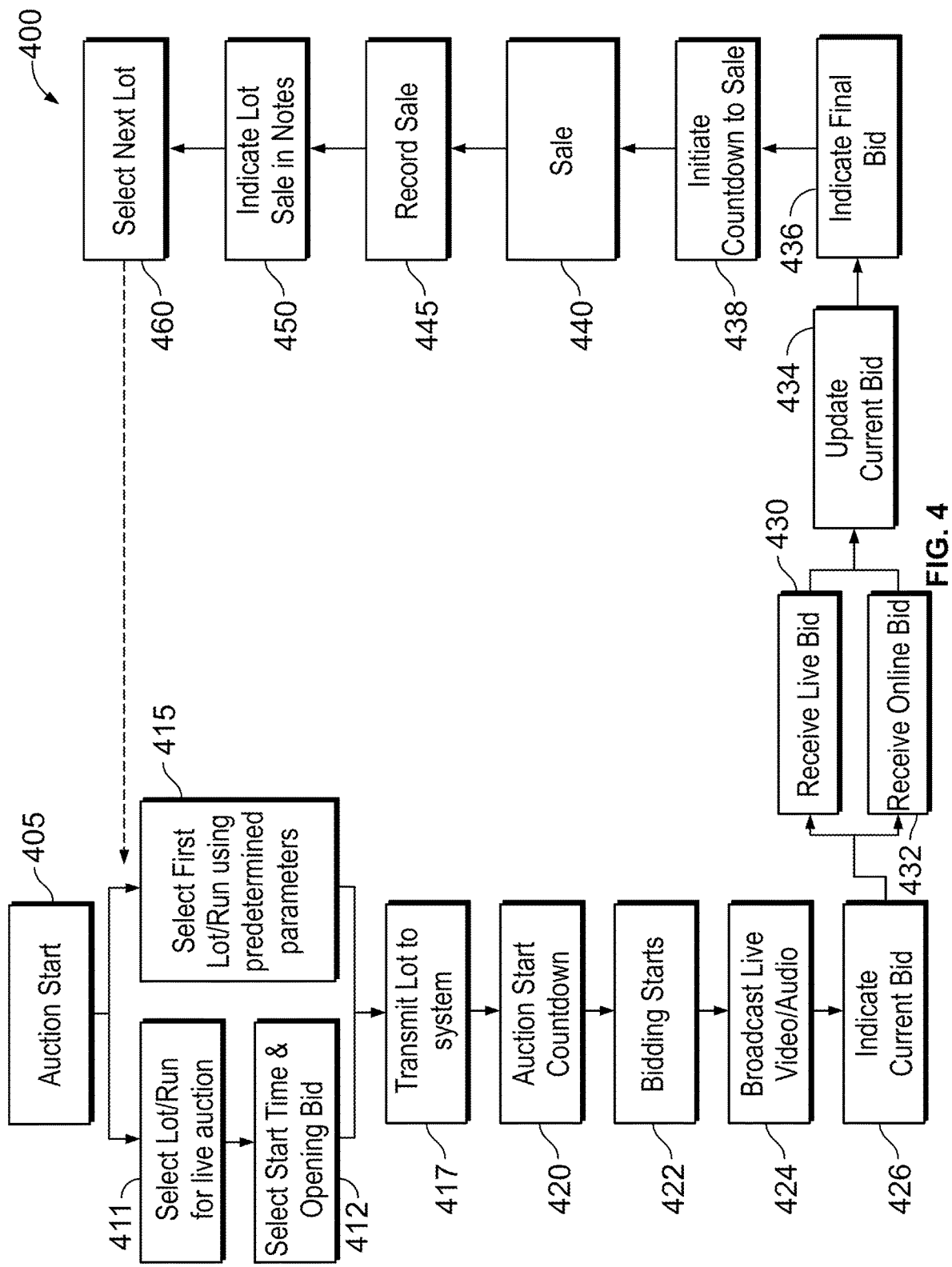
FIG. 4 is a flow chart illustrating another exemplary method.

Auction management system 110 includes inputs from one or more auction servers relating to auction, lot, bid, and sale status. FIG. 4 illustrates a flow chart depicting an example of the flow of information to and from the auctioneer or auction site into the auction management system. The example method 400 comprises the steps of indicating the auction start 405, initiating the lot for bidding by either selecting a predetermined lot with bid parameters and start times 415, or by selecting the lot for live auction 411, selecting a start time, 412, and selecting an opening bid 412, and then transmitting the lot initiation 417 to the auction management system 110. The auctioneer or auction site administrator can then initiate the lot bidding by indicating a countdown to the start of bidding 420 for the selected lot. At the start of bidding 422, a live video and/or audio feed 424 can be transmitted to the auction management system such that online auction participants can hear and/or see the auctioneer's call and the live bidding at the auction site. As the auction progresses the auctioneer or other auction site administrator indicates the current bid 426 to the auction management system 110. The auctioneer then receives and records a new bid either by receiving and recording a live bid 430 at the auction site or by receiving an online bid 432 via the auction management system 110. Upon receipt of the latest bid 430 or 432, the current bid 434 is updated in the system. When the auctioneer determines that bidding is complete, the auctioneer or other site administrator can indicate that there are no further bids 436 and initiate a countdown 438 to the final sale 440. Once the auctioneer states that the lot is sold, the lot sale is recorded 445 to the auction management system. The sale and lot information is then indicated 450 in the auctioneer messages fields of the auction management system 110. At this point the auctioneer or site administrator can reset the method by selecting the next lot up for sale.

The auction management system is configured to receive multiple feeds from multiple simultaneous auctions, which may be at geographically separated locations and/or different auction lanes at one location. The system thereby enables an online auction participant to bid on multiple auctions simultaneously and manage the input and bidding accordingly. In the illustrated embodiments the online auction participant has the option of making such bids on a lot being sold in one auction while continuing to monitor the progress of other auctions. This allows the online auction participant to conveniently bid on lots of interest in two or more different auctions.

Figure 5:
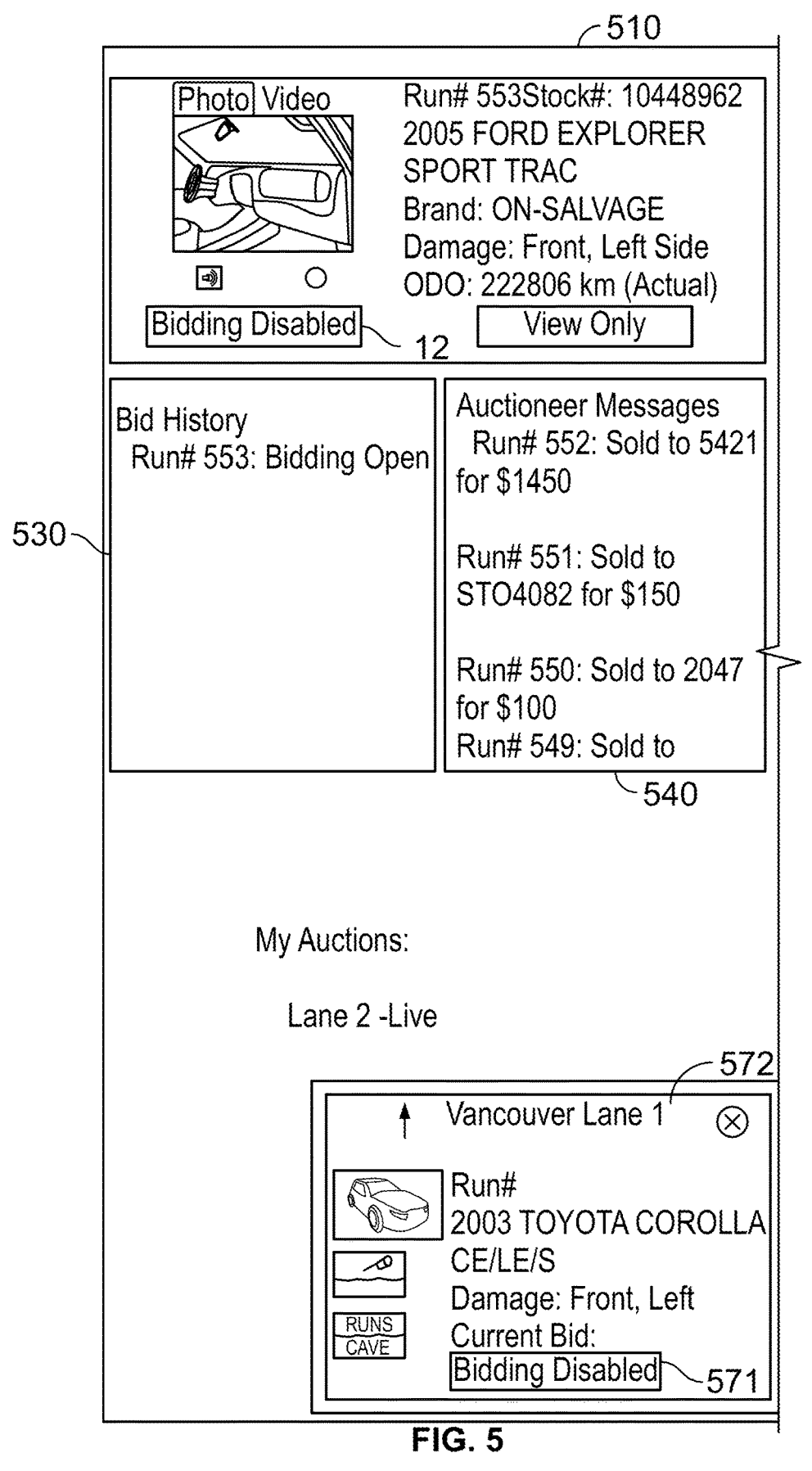

FIG. 5 is an example user interface for display of an online auction participant's device 130 of multiple simultaneous live simulcast auctions. In this particular example, multiple simulcast automobile auctions are displayed to the online auction participant. As shown in FIG. 5, a display at a user terminal includes the following interface fields: current lot & bid field 510; item specific information field 520; bid history field 530; auctioneer notes field 540; upcoming lots field 550; available auction site menu 560; active auction site field 570 including first participating auction 572, second participating auction 574, and third participating auction 576.

Available auction menu field 560 may be displayed when one or more auctions from one or more auction sites are available to the online auction participant. The available auction menu field 560 may be a drop down menu, a list, an icon field, or other indication of available auctions. The specific auctions made available to the online auction participant may be based on a variety of factors and may include subscription level, participation history, credit, payment history, geographic location, auction type, etc. In this particular example, field 560 indicates that no auctions are available to add, as the three available auctions are already displayed in the active auction site field 570. The three available auctions are displayed as lanes, namely, "Vancouver Lane 1," 572, "Oshawa Lane 1," 574, and "Oshawa Lane 2," 576.

Vancouver Lane 1, 572, displays certain information relating to the current lot or run that is active at that particular auction site. That information includes: the auction location name; the lot or run number (e.g., Run #1); the product brand or name of the item in the lot (e.g., a 2003 Toyota Corolla CE/LE/S); and the item condition (e.g., damage Front, Left). Additional information item or product information can be displayed in a scrolling manner in the lane window. In addition to the above information, the current bid for the lot is also displayed. The lane window 572 may also display an active button that allows the online auction participant to immediately place a bid to the auction management system 110. In the current example, the active bid button 571 indicates that bidding is disabled. Inclusion of the active bid button allows simultaneous participation by the online auction participant in all auctions displayed in the active auction site field 570, including, in this example, Oshawa Lane 1, 574, and Oshawa Lane 2, 576.

Each active auction window, 572, 574, and 576 may display similar information as described above and include an active bid button. In some embodiments, the number of lanes available for display and participation may be dependent on subscription level, participation level, payment history, auction type, etc.

In the example illustrated in FIG. 5, the online auction participant has selected the auction at Oshawa Lane 2, indicated in the active auction lane 576. As such, the current lot & bid field 510 provides information to the auction participant relating to the lot or run that is currently up for auction or next up for auction. In this example, the current lot & bid field 510 displays Run #553, and includes Stock #104489662. The vehicle associated with the lock is identified by its model year and model name (e.g., 2005 FORD EXPLORER SPORT TRAC). The Brand can indicate the manufacture or source of the vehicle, in the present example, the source of the vehicle from a salvager, indicated by ON-SALVAGE. The condition of the vehicle is indicated by the display, Damage: Front, Left Side. The odometer reading is also provided, e.g., ODO:222806 Km (Actual). Photos and video images are also available in the current lot & bid field 510. Also included in field 510 is an active button 511, which allows the user upon activation to place a bid on the current run in the auction management system 110 or to increase a previously entered maximum bid. In the present example, the active bid button 511 indicates that bidding is disabled.

Associated with the selected lane 576, vehicle specific information field 520 is also displayed on the graphic interface to the online auction participant. Here specific and detailed information can be included about the vehicle in the current lot. Detailed information can include stock number, vehicle identification numbers (VIN), Title information, Odometer reading (ODO), Transmission type (TRANS), Engine Cylinders and engine type, exterior color, interior color, trim type, entertainment system, navigation system, component lists, features lists, vehicle condition (including damage, damage estimate, loss type, airbag condition, key availability), and additional images.

Also included in the online auction participant's display is a bid history field 530, which indicates the lot or run number, when bidding is open, and a list of past bids, which may include the bid amount, the bid time, and who made the bid.

Also included in the online auction participant's display is an auctioneer's notes field 540, which may indicate the sale of previous lots or runs, along with the sale amount and the winning bidder. The auctioneer may also communicate other messages or indicators to the online auction participant, such as a temporary suspension of bidding, lot specific rules or conditions, reserves, or changes in the order of lot presentation.

The auction schedule including the order of lot presentation may be displayed to the online auction participant in the upcoming vehicles field 550, which may, for example, include the following information: lot or run number, item(s) or stock number(s); item(s) brand or model name, item(s) year, item(s) condition, pre-bid information, etc.

It will be appreciated that upon selection of a different active auction, 572 and 574, the information in field(s) 510, 520, 530, 540, and 550 will be changed and updated accordingly. Similarly, the available active auctions in field 570 will change with internal information staying current with the ongoing auction. In some embodiments, when an online auction participant bids on a particular run indicated in an active auction displayed in the active auction field 570 using the auction bid button 571, the display may automatically change such that field(s) 510, 520, 530, 540, and 550 are changed to the auction in which the bid was just placed.

EXAMPLE

The following example describes how a user could interact with a system as described herein in order to purchase salvaged vehicles. Joe Bidder (JB) wishes to acquire 2011 to 2015 Toyota Corollas™ that have running engines. JB accesses a web page associated with an auction management system as described herein and signs up as a user of the system. To sign up JB provides information about himself and provides a means of payment for auction purchases. JB searches the system using an interface like that shown in FIGS. 2E-2H for Toyota Corollas that meet his needs. From the search results he identifies 43 cars that would be suitable. After reading the descriptions and reviewing pictures of these cars, JB decides to bid on five of them. Two of these cars will be sold in Vancouver BC Canada, One of the cars will be sold in Calgary Alberta Canada, One of the cars will be sold in Oshawa Ontario Canada, and one of the cars will be sold in Hamilton Ontario Canada. All of these auctions will take place on the same day.

JB decides how much to bid for each of the cars taking into account the distance that the cars will need to be shipped to reach his shop, the condition of the cars, and the value of the parts in the cars. The system assists by providing an estimate of shipping costs from each auction site to JB's shop and by providing an estimate of the 'parts value' of each car based on which components of each car are undamaged and a database of parts values.

JB places pre bids for each of the cars he has selected. In each case, he identifies the maximum amount that he is willing to pay knowing that the system will only bid on his behalf an amount that is one bid increment more than the bid of the next-highest bidder (up to the maximum bid he has selected). The system helps by providing the total cost including a buyer's premium and applicable taxes.

On the day of the auctions, JB logs onto the system from his user device and watches the auctions in real time. JB can simultaneously view live feeds from all of the auctions that are on concurrently. JB selects the Oshua auction as a main view because the car he has pre-bid on in that auction is expected to be sold before the other cars that he has pre-bid for. JB watches and listens to the sale of the car at the Oshawa auction. JB is outbid and loses the auction for the car in Oshawa. He continues watching the sales of other lots in the Oshawa auction.

The system warns JB that the sale for the car he has bid on in Hamilton will be commencing soon by displaying a flashing highlight on the portion of the display corresponding to the view of the Hamilton auction. JB clicks on the view of the Hamilton auction to make the Hamilton auction the subject of the main view. This provides a higher quality view of the Hamilton auction and also provides audio from the Hamilton auction. The bids for the car at the Hamilton auction rise past the pre-bid that JB had placed. Having lost the auction for the first car in which he was interested, JB uses the interface on his user device in real time to place a higher bid in the Hamilton auction. After another bidder drops out, JB wins the Hamilton auction.

The auctions in Calgary and Vancouver are in different time zones and start later than the Oshawa and Hamilton auctions. The system warns JB when each of these auctions starts. The system warns JB when each car he has placed a pre-bid on is coming up for sale. As before, JB watches each auction in real time. JB wins the Calgary car and one of the Vancouver cars.

After winning each car, JB receives a communication from the system with details of the car won and the amount payable (including taxes and buyer's premium), and providing information regarding when and where JB can take possession of the car.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

In addition to the above mentioned examples, various other modifications and alterations of the features may be made without departing from the scope of the features. Accordingly, the above disclosure is not to be considered as limiting, and the appended claims are to be interpreted as encompassing the true spirit and the entire scope of the features.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "machine-readable storage medium," as the term is used herein, includes any mechanism that can store information in a form accessible by a machine (a machine may be, for example, a computer, network device, cellular phone, smart device, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

These computer program instructions may also be stored in a computer readable medium that can direct a computer, other programmable data processing apparatus, or other devices to function in a particular manner, such that the instructions stored in the computer readable medium produce an object of manufacture, including instructions that implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Although various features may be described in the context of a single embodiment, the features may also be provided separately or in any suitable combination. Conversely, although the features may be described herein in the context of separate embodiments for clarity, the features may also be implemented in a single embodiment.

Reference in the specification to "some embodiments," "an embodiment," "one embodiment," or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only.

It is to be understood that the details set forth herein do not construe a limitation to an application of the features.

Furthermore, it is to be understood that the features can be carried out or practiced in various ways and that the features can be implemented in embodiments other than the ones outlined in the description above.

It is to be understood that the terms "including," "comprising," "consisting," and grammatical variants thereof do not preclude the addition of one or more components, features, steps, or integers or groups thereof and that the terms are to be construed as disclosing additional possible components, features, steps, or integers.

The invention claimed is:

1. An auction management system comprising:
a network interface configured to receive a plurality of data feeds from a respective plurality of live online auction sites, each related to a live auction occurring at a discretion of a live auctioneer at the respective auction site;
a display screen configured to partition a display area into a plurality of display sections, each display section corresponding to a respective one of the plurality of auction sites, and each displaying respective auction information for each of the respective auction sites; and
a processor configured to:
display auction information for each of the plurality of auction sites from the respective plurality of data feeds, including a bid option for each of the respective auction sites;
display second auction information included in the second data feed in the second display section at a first time, the second display section including a second bid option, the second auction information automatically moving to the first display section at a second time and the first auction information automatically moving to the second display section at the second time;
receive, for at least one of the auction sites, a respective bid input corresponding to the at least one auction site bid option; and
transmit the bid input to the respective auction site.

2. The auction management system of claim 1, wherein each display section further includes at least one of a current lot field, a bid history, auctioneer notes, item specific information, or upcoming lots information related to the respective auction site.

3. The auction management system of claim 1, wherein the processor is further configured to generate a notification alert in one of the display sections corresponding to the at least one auction site, notifying to a bidder who is remote from the at least one auction site of a time dependent event for the at least one auction site.

4. The auction management system of claim 3, wherein the notification alert is at least one of an audio alert, a voice alert, a pop-up window, or a visual alert included within the respective display section.

5. The auction management system of claim 1, wherein each of the display sections includes streaming audio and streaming video relating to the respective data feeds for the auction sites corresponding to the display sections.

6. The auction management system of claim 1, wherein each of the display sections includes streaming audio and streaming video relating to the respective data feeds for the auctions sites corresponding to the display sections, and the processor is configured to, for at least one of the display sections, filter the streaming video of the at least data feed corresponding to the at least one display section, to display the respective auction information without the streaming video.

7. The auction management system of claim 1, wherein each of the display sections includes streaming audio and streaming video relating to the respective data feeds for the auctions sites corresponding to the display sections, and the processor is configured to, for at least one of the display sections, reduce a resolution of the streaming video of the at least data feed corresponding to the at least one display section.

8. The auction management system of claim 1, wherein the processor is further configured to, for each of the plurality of auction sites:
monitor a calendar listing included in the data feed;
detect a lot item ordered for auction a predetermined number of items prior to a lot of interest; and
based on the lot item ordered for auction the predetermined number of items prior to the lot of interest is detected, generate a notification alert in the respective display section.

9. The auction management system of claim 8, where the notification alert is at least one of an audio alert, a voice alert, a pop-up window, or a visual alert included within the respective display section.

10. The auction management system of claim 1, wherein the plurality of live online auction sites includes two or more live online auction sites.

11. A method, comprising:
displaying auction information for each of a plurality of live online auction sites from a respective plurality of data feeds, including a bid option for each of the respective auction sites, wherein a network interface is configured to receive the plurality of data feeds from the plurality of auction sites, each related to a live auction occurring at a discretion of a live auctioneer at the respective auction site, and wherein a display screen is configured to partition a display area into a plurality of display sections, each display section corresponding to a respective one of the plurality of auction sites, and each displaying respective auction information for each of the respective auction sites;
displaying second auction information included in the second data feed in the second display section at a first time, the second display section including a second bid option, the second auction information automatically moving to the first display section at a second time and the first auction information automatically moving to the second display section at the second time;
receiving, for at least one of the auction sites, a respective bid input corresponding to the at least one auction site bid option; and
transmitting the bid input to the respective auction site.

12. The method of claim 11, wherein each display section further includes at least one of a current lot field, a bid history, auctioneer notes, item specific information, or upcoming lots information related to the respective auction site.

13. The method of claim 11, further comprising:
generating a notification alert in one of the display sections corresponding to the at least one auction site, notifying to a bidder who is remote from the at least one auction site of a time dependent event for the at least one auction site.

14. The method of claim 13, wherein the notification alert is at least one of an audio alert, a voice alert, a pop-up window, or a visual alert included within the respective display section.

15. The method of claim 11, wherein each of the display sections includes streaming audio and streaming video relating to the respective data feeds for the auction sites corresponding to the display sections.

16. The method of claim 11, wherein each of the display sections includes streaming audio and streaming video relating to the respective data feeds for the auctions sites corresponding to the display sections, and wherein the method further comprises:

for at least one of the display sections, filtering the streaming video of the at least data feed corresponding to the at least one display section, to display the respective auction information without the streaming video.

17. The method of claim 11, wherein each of the display sections includes streaming audio and streaming video relating to the respective data feeds for the auctions sites corresponding to the display sections, and wherein the method further comprises:

for at least one of the display sections, reducing a resolution of the streaming video of the at least data feed corresponding to the at least one display section.

18. The method of claim 11, wherein the method further comprises:

for each of the plurality of auction sites:
        monitoring a calendar listing included in the data feed;
        detecting a lot item ordered for auction a predetermined number of items prior to a lot of interest; and
        based on the lot item ordered for auction the predetermined number of items prior to the lot of interest is detected, generating a notification alert in the respective display section.

19. The method of claim 18, where the notification alert is at least one of an audio alert, a voice alert, a pop-up window, or a visual alert included within the respective display section.

20. A non-transitory computer-readable medium having processor-executable instructions stored thereon, wherein the processor-executable instructions, when executed, facilitate:

displaying auction information for each of a plurality of live online auction sites from a respective plurality of data feeds, including a bid option for each of the respective auction sites, wherein a network interface is configured to receive the plurality of data feeds from the plurality of auction sites, each related to a live auction occurring at a discretion of a live auctioneer at the respective auction site, and wherein a display screen is configured to partition a display area into a plurality of display sections, each display section corresponding to a respective one of the plurality of auction sites, and each displaying respective auction information for each of the respective auction sites;

displaying second auction information included in the second data feed in the second display section at a first time, the second display section including a second bid option, the second auction information automatically moving to the first display section at a second time and the first auction information automatically moving to the second display section at the second time;

receiving, for at least one of the auction sites, a respective bid input corresponding to the at least one auction site bid option; and transmitting the bid input to the respective auction site.

\* \* \* \* \*